United States Patent [19]

Furukawa et al.

[15] 3,657,046

[45] Apr. 18, 1972

[54] PROCESS FOR ADHERING RUBBER TO RUBBER OR METAL WITH HALOGENATED TERPOLYMER OF ETHYLENE-α-OLEFIN-NON-CONJUGATED DIOLEFIN

[72] Inventors: Junji Furukawa; Shinzo Yamashita, both of Kyoto; Kunihiko Ikkaku; Norio Kitahara, both of Kobe; Shozo Maeda, Nishinomiya; Shigeru Tajima, Ashiya, all of Japan

[73] Assignees: Sumitomo Chemical Company, Ltd., Osaka, Japan; Sakai Chemical Industry Co., Ltd., Kobe, Japan

[22] Filed: Feb. 4, 1970

[21] Appl. No.: 8,751

Related U.S. Application Data

[63] Continuation-in-part of Ser. No. 640,325, May 22, 1967.

[52] U.S. Cl. ............................... 156/315, 156/333, 161/218, 161/254, 260/80.78, 260/889
[51] Int. Cl. .......................................... C09j 3/12, C09j 5/02
[58] Field of Search .................. 156/333, 315; 260/94.7 HA, 260/80.77, 80.78, 889; 161/218, 254

[56] References Cited

UNITED STATES PATENTS

| | | | |
|---|---|---|---|
| 3,347,817 | 10/1967 | Gladding et al. | 156/333 X |
| 3,367,827 | 2/1968 | Gallagher | 161/227 |
| 3,049,455 | 8/1962 | Werkman et al. | 156/333 |
| 3,222,330 | 12/1965 | Nyce et al. | 260/80.77 X |
| 3,387,839 | 6/1968 | Miller et al. | 156/333 X |
| 3,429,769 | 2/1969 | Ippen et al. | 161/217 |

*Primary Examiner*—Carl D. Quarforth
*Assistant Examiner*—E. A. Miller
*Attorney*—Stevens, Davis, Miller & Mosher

[57] ABSTRACT

A lowly or highly unsaturated rubber, such as ethylene-propylene-non-conjugated diolefin terpolymer, isoprene-isobutylene rubber, natural rubber, polyisoprene rubber, polybutadiene rubber, styrene-butadiene rubber, polychloroprene rubber, acrylonitrile-butadiene rubber, is strongly adhered to the same or a different rubber or a metal, such as mild steel or brass, by using, as an adhesive, a halogenated terpolymer of ethylene, an α-olefin other than ethylene, such as propylene, and a non-conjugated diolefin, such as dicyclopentadiene or divinylbenzene, ethylidenenorbornene, 1,4-hexadiene, said halogenated terpolymer having a halogen content of 13 to 50 % by weight. A conventional primer may or may not be used to adhere to the rubber to the metal with the halogenated terpolymer. Adhesion is effected by heating an assembly consisting of the substrates to be bonded and the adhesive interposed therebetween under pressure.

10 Claims, No Drawings

PROCESS FOR ADHERING RUBBER TO RUBBER OR METAL WITH HALOGENATED TERPOLYMER OF ETHYLENE-α-OLEFIN-NON-CONJUGATED DIOLEFIN

This is a continuation-in-part of application Ser. No. 640,325, filed May 22, 1967.

The present invention relates to a process for adhering a compounded rubber to the same or a different compounded rubber or a metal. More particularly, it relates to a process for adhering said substrates to each other by using, as an adhesive, a halogenated terpolymer of ethylene, an α-olefin other than ethylene and a non-conjugated diolefin, having a halogen content of 13 to 50 percent by weight.

Hitherto, rubber doughs obtained by simply dissolving compounded rubbers in organic solvents or a mixture thereof with isocyanates have been used to adhere rubbers to each other or a rubber to a metal. This method, however, has not provided a satisfactory adhesion. Particularly, in the adhesion between different compounded rubbers, such as between a compounded lowly unsaturated rubber and a compounded highly unsaturated rubber, said method is unsatisfactory owing to the difference in polarity between the base of the rubber dough and the materials to be bonded and the difference in rate of vulcanization between these materials. In the adhesion of compounded rubbers containing a large amount of a processing oil, such as lowly unsaturated rubbers, also, no satisfactory result has been obtained because the processing oil contained in the compounded rubbers to be bonded migrates to the adhesive layer and reduces the adhesive strength. This has raised a serious problem in the manufacture of rubber industrial articles, tyre rubber footwear, etc.

Belgian Pat. No. 648,665 discloses that a lowly unsaturated rubber obtained by reacting a rubber with a halogen or halogens to a halogen content of 1 to 10 percent by weight is compatible with other rubbers and can be vulcanized with sulfur. Said Belgian patent relates to use other than the use as adhesive, and the halogen content is limited to up to 10 percent by weight. This is considered to be reasonable in view of the rate of vulcanization and the decomposition of rubber. However, the halogenated lowly unsaturated rubber having a halogen content of 10 percent by weight or less gave no adhesion effect when they were applied as adhesives which might require similar properties.

Completely adhering a compounded lowly unsaturated rubber to a metal has been extremely difficult, and this fact has constituted an obstacle to the formation of industrial articles.

The chlorides of isoprene rubber, polybutadiene rubber, poly-olefin polymers, etc. have heretofore been used to produce a bond between a compounded rubber and a metal. They have been effective in producing a bond between a metal and a conventional compounded rubber, such as natural rubber, chloroprene rubber, butadiene-acrylonitrile rubber or the like, but have been unsatisfactory in an adhesion between a lowly unsaturated rubber and a metal. The adhesion between a compounded lowly unsaturated rubber and a metal has been a very important problem in the art to utilize the excellent characteristics of the compounded lowly unsaturated rubber.

It has also been known that a butadiene-methacrylic acid copolymer or a butadiene-styrene-methacrylic acid terpolymer was effective in producing an adhesion between a compounded rubber and a metal. Although these polymers have been considered to be effective in producing a bond between natural rubber or a styrene-butadiene rubber and a metal, they have not been able to form a satisfactory bond between a lowly unsaturated rubber and a metal and between the same or different compounded rubbers, particularly between compounded lowly unsaturated rubbers, such as ethylene-propylene-non-conjugated diolefin terpolymers or isoprene-isobutylene rubbers or between any one of such compounded lowly unsaturated rubber and highly unsaturated rubber, such as natural rubber, a styrene-butadiene rubber, a chloroprene rubber, an acrylonitrile-butadiene rubber or the like.

In order to adhere a compounded rubber to a metal, it is necessary for the adhesive to have double bonds in such a degree as to allow the covulcanization thereof with the rubber and contain a carboxyl group which is effective in forming a hydrogen bond between the adhesive and the hydroxide layer on the surface of the metal. The above-mentioned butadiene-methacrylic acid copolymer and butadiene-styrene-methacrylic acid terpolymer satisfy these conditions, but are rather strikingly different in polarity from the lowly unsaturated rubbers and are scarcely compatible and their degree of covulcanization with the lowly unsaturated rubbers is insufficient to produce a bond. Therefore, they could not give a satisfactory adhesive effect.

U.S. Pat. No. 3,367,827 discloses that a brominated ethylene-propylene-dicyclopentadiene copolymer having a bromination content of 8.6 percent or 26 percent can be used to adhere a substrate selected from the group consisting of polyamide, polyester or cellulosic substrates to a lowly unsaturated rubber compound, said substrate having previously been coated with a heat-hardening phenol-aldehyde type resin. However, said U.S. patent is quite silent on the use of said brominated terpolymer to adhere a rubber to a metal or a rubber, regardless of the use of the heat-hardening phenol-aldehyde type resin.

Unexpectedly, it has been found by us that good adhesion is obtained between the same or different compounded rubbers or between a compounded rubber and a metal by using, as adhesive, a halogenated terpolymer of ethylene, and α-olefin other than ethylene and a non-conjugated diolefin having a a halogen content of 13 to 50 percent by weight.

The object of the present invention is to provide a process for adhering a compounded rubber to the same or a different compounded rubber or a metal.

According to the present invention, there is provided a process for adhering an unvulcanized rubber to the same or a different rubber or a metal, which comprises applying a solution in an organic solvent of a halogenated terpolymer of ethylene, an α-olefin other than ethylene and a non-conjugated diolefin having a halogen content of 13 to 50 percent by weight to at least one of the substrates to be adhered, contacting the substrates with each other through the applied solution and heating under pressure the resulting assembly.

The halogenated terpolymer may be used alone or in admixture with suitable vulcanizing compounding agents. The halogen content of said halogenated terpolymer is preferably 16 to 38 percent by weight.

The halogenated terpolymer may be prepared by reacting a terpolymer consisting of ethylene, an α-olefin other than ethylene and a small amount of a non-conjugated diolefin with a halogen or halogens, such as chlorine and bromine, in a chlorinated hydrocarbon, such as carbon tetrachloride, chloroform, trichloroethylene, tetrachloroethylene or monochlorobenzene in the presence or absence of light, a radical initiator, etc. When a mixture of chlorine and bromine is used, usually, bromination is first effected and chlorination is then effected. In this case, bromine is preferably contained in an amount of 10 percent by weight or less.

The α-olefin other than ethylene is represented by the formula:

$$R - CH = CH_2$$

wherein R is an alkyl group having one to eight carbon atoms, and a typical example of the olefin is propylene.

The non-conjugated diolefin which may be used in the present invention include, for example, divinyl-benzene, 1,4-hexadiene, dicyclopentadiene, cyclo-octadiene, ethylidenenorbornene, isopropylidenenorbornene, etc.

The organic solvents to be used to dissolve a halogenated terpolymer in the present invention are halogenated hydrocarbons, aromatic hydrocarbons and aliphatic hydrocarbons. Examples of the organic solvents include carbon tetrachloride, chloroform, toluene, xylene, n-hexane, etc.

The compounded rubber to which the present process can be applied include compounded lowly unsaturated rubbers, such as butyl rubber (an isobutylene-isoprene copolymer), ethylene-propylene-non-conjugated diolefin terpolymer, etc., and compounded highly unsaturated rubbers, such as polyisoprene rubber, polybutadiene rubber, a styrene-butadiene copolymer rubber, an acrylonitrile-butadiene copolymer rubber, polychloroprene rubber, etc.

According to the present process, a strong and complete bond can be formed between the same or different compounded rubbers, particularly between compounded lowly unsaturated rubbers containing a large amount of a processing oil or between a compounded lowly unsaturated rubber and a compounded highly unsaturated rubber or any one of the above-mentioned compounded rubber and a metal, such as mild steel, brass or the like.

In the present invention, it is critical for the halogenated terpolymer to have a halogen content of 13 to 50 percent by weight. If a terpolymer having a halogen content of less than 13 percent by weight is used, a satisfactory adhesion cannot be obtained. Further, if the halogen content exceeds 50 percent by weight, disintegration of rubber molecule is caused by halogenation as seen from experimental results.

The vulcanizing compounding agent which may be used in the present invention includes peroxides, hydroperoxides, sulfur, stannous chloride, phenol resin liquids, such as novolak resin produced by a condensation of tert.-butylphenol and formaldehyde; vulcanizing agents, such as metal oxides and bismaleimides; and active fillers, such as hydrosilicates, silicates and particularly carbon black. Chlorinated rubber, rubber hydrochloride, halogenated synthetic rubbers, etc. may also be used as compounding agents.

In the present process, it is advantageous to use carbon black as reinforcing agent. A dispersion of carbon black in a halogenated terpolymer solution to be used as adhesive is used to adhere a lowly unsaturated rubber to another rubber or a metal. The weight ratio of the halogenated terpolymer to the carbon black varies depending upon the kind of substrates to be bonded. However, it is usually 10 : 2 to 10 : 8.

In the present process, the halogenated terpolymer solution may be applied to the surface of a compounded curable rubber and the surface of another substrate containing a compounded rubber to be bonded to said compounded curable rubber to form an adhesive layer on the respective surfaces, and the adhesive layers on these surfaces are then contacted with each other to interpose the adhesive layers between the compounded rubber and the substrate. Finally, the resulting assembly is heated under pressure to be vulcanized, whereby such a strong bond can be formed between these substrates that a break of either of the substrates may occur in peeling test.

A primer may or may not be used to bond a metal to a rubber. The primer is applied to the surface of a metal to form a primer layer, and the halogenated terpolymer solution is then applied to said primer layer to form an adhesive layer. A compounded uncured lowly unsaturated rubber is then contacted with the adhesive layer under pressure and the resulting assembly is heated to be vulcanized. By this method, there can be obtained a bond so strong that a break of the compounded rubber may occur in peeling test. There may be used a conventional primer, such as a chlorinated rubber, rubber hydrochloride, a halogen-containing rubber, such as poly-2-chlorobutadiene or a halogenated butadiene polymer or copolymer, such as brominated poly-2-chlorobutadiene, chlorinated polybutadiene in combination with a halide or a mixed polymer such as a mixed polymer of acrylic acid with an ethylene-propylene-non-conjugated diene terpolymer. The halogenated terpolymer of the present invention alone or in admixture with a conventional primer resin can also be used as primer resin. A primer, such as chlorinated rubber, is oriented on the metal surface and can be strongly bonded to the metal. The halogenated terpolymer can strongly be adhered to the primer because it has a solubility similar to that of the primer.

Since the halogenated terpolymer of the present invention has a suitable polarity, it is oriented in various compounded rubbers having different polarities and cross-linked with the rubber molecule by liberation of hydrogen halide from the halide during vulcanization. Thus, a strong primary bond is formed and an excellent adhesive effect is obtained. The presence of vulcanizing compounding agents and a reinforcing agent increase the cross-linking rate and the cross-linkage density in the adhesive layer, and reinforces the adhesive layer itself, whereby the adhesive effect is further increased.

In the adhesive composition used in the present invention, also, the ahlogenated terpolymer forms a strong primary bond by a cross-linkage with the same or a different compounded rubber. The cross-linkage density of the adhesive composition is increased by polymerizing an unsaturated compound with the lowly unsaturated rubbers. The addition of vulcanizing compounding agents and the complete cure of the adhesive composition prevent a bond strength from being reduced by the migration of a processing oil from the compounded rubber to be bonded.

The present invention is further illustrated by the following Examples. However, it is not intended to limit the invention. The composition of Adherends $C_1$ to $C_6$ and the properties of vulcanizates thereof are shown in Tables 1 and 2, respectively. In all the Examples, an adhesion test was made after the adherends had been contacted with each other and the assembly had been subjected to heating and vulcanization by pressing it at 160° C. for 20 minutes.

TABLE 1

| Components (g.) | Composition of adherends | | | | | |
|---|---|---|---|---|---|---|
| | $C_1$ | $C_2$ | $C_3$ | $C_4$ | $C_5$ | $C_6$ |
| Ethylene-propylene terpolymer ("Royalene 301") | 100 | 100 | | | | |
| Isoprene-isobutylene rubber ("Polysarbutyl 301") | | | 100 | | | |
| Natural rubber ("Smoked Sheet No. 1") | | | | 50 | | |
| Styrene-butadiene rubber ("JSR 1502") | | | | | 100 | |
| Chloroprene rubber ("Neoprene W") | | | | | | 100 |
| Carbon black (EPC) | 50 | 50 | 80 | 50 | 60 | 50 |
| Naphthene hydrocarbons | 10 | 50 | | | | |
| Zinc oxide | 5 | 5 | 5 | 10 | | |
| Tetramethylthiuram monosulfide | 1.5 | 1.5 | | | 7 | 5 |
| Mercaptobenzothiazole | 0.5 | 0.5 | 1 | | | |
| Stearic acid | 1.0 | 1.0 | 2 | 1.5 | | |
| Sulfur | 1.5 | 1.5 | 2 | 2.5 | 2 | 1 |
| Vaseline | | | 2 | | | |
| Tetramethylthiuram disulfide | | | 1 | | 0.3 | |
| Pine tar | | | | 2 | | |
| N-cyclohexyl-2-benzothiazole sulfenamide | | | | 0.7 | | |
| Aromatic hydrocarbons | | | | | 6 | 4 |
| Dibenzothiazyl disulfide | | | | | 1.2 | |
| Magnesium oxide | | | | | | 4 |
| 2-mercaptoimidazoline | | | | | | 0.8 |

TABLE 2

| | Properties* of adherends | | | | | |
|---|---|---|---|---|---|---|
| | $C_1$ | $C_2$ | $C_3$ | $C_4$ | $C_5$ | $C_6$ |
| Modulus at 300% extension (kg./cm.²) | 163 | 114 | 61 | 120 | 168 | 219 |
| Tensile strength (kg./cm.²) | 214 | 153 | 121 | 273 | 240 | 250 |
| Elongation (percent) | 390 | 440 | 580 | 550 | 390 | 360 |
| Hardness | 66 | 55 | 59 | 58 | 74 | 66 |

*The properties of vulcanizates of $C_1$ and $C_2$ obtained by press-curing at 160° C. for 20 minutes, vulcanizates of $C_3$, $C_5$ and $C_6$ obtained by press-curing at 147° C. for 20 minutes and vulcanizates of $C_4$ obtained by press-curing at 141° C. for 10 minutes were measured.

COMPARATIVE EXAMPLE

TABLE 3

| Components | Adhesive Compositions | | |
|---|---|---|---|
| | $A_1$ | $A_2$ | $A_3$ |
| Halogenated ethylene-propylene-dicyclopentadiene terpolymer(g.) | 100*1 | 100*2 | 100*3 |
| Carbon black (EPC)*4(g.) | 40 | 40 | 40 |
| Zinc oxide(g.) | 5 | 5 | 5 |
| Mercaptobenzothiazol(g.) | 1 | 1 | 1 |
| Tetramethylthiuram disulfide(g.) | 3 | 3 | 3 |
| Toluene(g.) | 1,341 | 1,341 | 1,341 |

*1 Chlorine content: 8.5 percent by weight

*2 Chlorine content: 5.0 percent by weight Bromine content: 2.5 percent by weight

*3 Chlorine content: 18.3 percent by weight

*4 Channel black

Compounded rubbers were bonded to each other with the above Adhesive Compositions $A_1$ to $A_3$ and the assemblies were subjected to press-vulcanization at 160° C. for 20 minutes. The assemblies were then subjected to 180° peeling test according to the method described in JIS K-6301. As can be seen from Table 4, the Adhesive Compositions $A_1$ and $A_2$ having a halogen content of lower than 10 percent gave a far lower bond strength than the adhesive composition $A_3$ according to the present invention. Judging from the state of adhesion break, in the case of $A_3$ such a firm bond can be produced that a break of the bonded rubber may occur in peeling test. On the other hand, in case of $A_1$ and $A_2$, peeling occurred at the interface between the adherend surface and the adhesive layer. Therefore, a halogenated terpolymer having a halogen content lower than 10 percent cannot give a satisfactory adhesive effect. Thus the unique effect of the adhesive according to the present invention is remarkable. This fact is found also in bonding between a compounded rubber and another adherend. For the purpose of the present invention a polymer having a halogen content of at least 10 percent must be used.

TABLE 4

| Adherend | Adhesive Compositions | | |
|---|---|---|---|
| | $A_1$ | $A_2$ | $A_3$ |
| $C_1-C_1$ | 6.3 kg/cm | 2.3 kg/cm | (R) 8.0 kg/cm |
| $C_2-C_4$ | 2.5 kg/cm | 2.8 kg/cm | (R) 4.2 kg/cm |
| $C_2-C_5$ | 1.2 kg/cm | 1.5 kg/cm | (R) 3.8 kg/cm |
| $C_2-C_6$ | 0.8 kg/cm | 1.0 kg/cm | (R) 4.5 kg/cm |

Note: (R) represents a break of the adherend (compounded rubber).

It will be deduced from the above experimental results that, if a halogen content is lower than 13 percent by weight, an adherend having a high polarity is difficult to orient against a compounded rubber owing to the unsuitable polarity of the adhesive composition and the cross-linkage of the adhesive layer is insufficient for the purpose of the present invention whereby a sufficient adhesive effect will not be obtained.

EXAMPLE 1

TABLE 5

| | Adhesive Composition $B_1$ |
|---|---|
| Halogenated ethylene-propylene-divinylbenzene terpolymer (Chlorine content : 37% by weight(g.) | 100 |
| Carbon black (EPC)(g.) | 20 |
| Benzotrichloride(g.) | 2 |
| Stannous chloride(g.) | 2.5 |
| n-Hexane(g.) | 520 |
| Toluene(g.) | 600 |

Adhesive Composition $B_1$ was applied to both adherends by means of brush at a rate of 190 g./m² and then dried at room temperature for about 30 min. The adherends were put one on the other so that the adhesive composition layers were contacted and the resulting assembly was subjected to press-curing at 160° C. for 20 min. After the curing, the thickness of rubber substrates was adjusted to about 3 mm., and the adhered substrates were subjected to a 180+ peeling test as mentioned hereinbefore to obtain a result as shown in Table 6. For comparison, the same procedure was repeated by use of a toluene treated adherend and a rubber dough. The results obtained are also shown in the same Table.

TABLE 6

| Adherends | Adhesive compositions | | |
|---|---|---|---|
| | $B_1$ of the present invention | Toluene treatment | Rubber dough |
| $C_1-C_1$ | (R) 8.0 kg/cm | (R) 8.0 kg/cm | (R) 8.0 kg/cm |
| $C_1-C_3$ | (R) 4.2 kg/cm | 2.2 kg/cm | 2.8 kg/cm |
| $C_1-C_4$ | (R) 4.5 kg/cm | 1.0 kg/cm | 0.8 kg/cm |
| $C_1-C_5$ | (R) 4.0 kg/cm | 0.8 kg/cm | 0.5 kg/cm |
| $C_1-C_6$ | (R) 5.2 kg/cm | 0.5 kg/cm | 0.4 kg/cm |
| $C_3-C_4$ | (R) 3.8 kg/cm | 0.7 kg/cm | 0.7 kg/cm |
| $C_3-C_6$ | (R) 4.5 kg/cm | 0.4 kg/cm | 0.5 kg/cm |

(R) represents a break of compounded rubbers to be bonded and means that a bond was complete.

Toluene treatment is a process of bonding which comprises applying toluene to both the surfaces of an adherend to make them adhesive.

Rubber dough means a 10 percent solution of the curable compounded rubber $C_1$ in toluene which may be used as an adhesive.

EXAMPLE 2

TABLE 7

| | Adhesive composition $B_2$ |
|---|---|
| Halogenated ethylene-propylene-dicyclopentadiene terpolymer (Chlorine content : 21% by weight)(g.) | 100 |
| Hydrosilicate(g.) | 10 |
| Zinc oxide(g.) | 5 |
| Magnesium oxide(g.) | 4 |
| Di-o-tolylthiourea(g.) | 0.2 |
| 2-Mercaptoimidazoline(g.) | 0.5 |
| Chloroform(g.) | 500 |
| Toluene(g.) | 508 |

In a manner similar to that in Example 1, compounded rubbers as shown in Table 8 were bonded to each other, except that Adhesive Composition $B_2$ was substituted for Adhesive Composition $B_1$ to obtain results as shown in the same Table. As seen from said Table, Adhesive Composition $B_2$ is superior in adhesion to toluene treatment and a mixture of rubber dough and an isocyanate.

TABLE 8

| Adherends | Adhesive compositions | | |
|---|---|---|---|
| | $B_2$ of the present invention | Toluene treatment | Mixture* of rubber dough and iso- |

| | | | cyanate |
|---|---|---|---|
| $C_1$-$C_2$ | (R) 5.6 kg/cm | 4.5 kg/cm | 5.0 kg/cm |
| $C_1$-$C_4$ | (R) 4.3 kg/cm | 1.0 kg/cm | 1.2 kg/cm |
| $C_1$-$C_6$ | (R) 4.8 kg/cm | 0.5 kg/cm | 0.8 kg/cm |

Note * The mixture was prepared by mixing 100 parts by weight of rubber contained in the rubber dough and 5 parts by weight of an isocyanate.

EXAMPLE 3

TABLE 9

| | Adhesive Composition $B_3$ |
|---|---|
| Halogenated ethylene-propylene-dicyclopentadiene terpolymer (Chlorine content : 18% by weight, Bromine content : 5.5% by weight) (g.) | 100 |
| Zinc oxide(g.) | 5 |
| Dicumyl peroxide(g.) | 0.5 |
| N,N'-m-phenylene-bismaleimide(g.) | 2.0 |

In the same manner as in Example 1, compounded rubbers were bonded to each other, except that Adhesive Composition $B_3$ was substituted for Adhesive Composition $B_1$, to obtain results as shown in Table 10, which shows that Adhesive Composition $B_3$ is superior in adhesion to toluene treatment, rubber dough and a mixture of rubber dough and an isocyanate when compared with Examples 1 and 2.

TABLE 10

| Adherends | Adhesive Composition $B_3$ according to the present invention |
|---|---|
| $C_1$-$C_4$ | (R) 4.5 kg/cm |
| $C_3$-$C_4$ | (R) 4.0 kg/cm |
| $C_1$-$C_6$ | (R) 5.6 kg/cm |
| $C_3$-$C_6$ | (R) 4.7 kg/cm |

EXAMPLE 4

TABLE 11

Primer

| | Adhesive Composition D (Primer) |
|---|---|
| Chlorinated rubber (Chlorine content : 65% by weight) (g.) | 100 |
| Magnesium oxide(g.) | 1 |
| Zinc oxide(g.) | 0.5 |
| Methyl isobutyl ketone(g.) | 400 |

According to the recipe as shown in Table 11, chlorinated rubber was dissolved in methyl isobutyl ketone. Into the solution magnesium oxide and zinc oxide were then added and uniformly dispersed to produce a primer solution.

TABLE 12

| | Adhesive Composition $B_4$ |
|---|---|
| Halogenated ethylene-propylene-dicyclopentadiene terpolymer (Chlorine content : 30% by weight (g.) | 60 |
| Chlorinated rubber (Chlorine content : 65% by weight) (g.) | 40 |
| Dicumyl peroxide(g.) | 1 |
| N,N'-m-phenylenebismaleimide(g.) | 4 |
| Xylene(g.) | 400 |

The above halogenated terpolymer and chlorinated rubber shown in Table 12 were dissolved in xylene. Dioumyl peroxide and N,N'-m-phenylenebismaleimide were uniformly dispersed in the solution to prepare an adhesive composition $B_4$.

Adherends $C_1$ and $C_2$ were bonded to various metals in the following manner: The surface of a metal was polished with sand paper and then defatted with trichloroethane. Adhesive Composition D(primer) was applied to the thus treated metal at a rate of about 90 g./m² and then dried at room temperature for about 30 min. Adhesive Composition $B_4$ was applied to the primer layer in substantially the same amount and then dried under the same conditions. Adherend $C_1$ or $C_2$ was inserted into the thus obtained two sheets of metal plates and the resulting assembly was heated and pressed at 160° C. for 20 min. to cure the adherends and adhesives. The thus obtained product was subjected to parallel peeling test according to JIS K-6301. The results obtained were as shown in Table 13.

$E_1$ and $E_2$ for comparison were the adhesives obtained by mixing 10 parts by weight of a 20 percent solution of a triisocyanate with 100 parts by weight of a 20 percent solution of Adherend $C_1$ and $C_2$, respectively, in toluene. The metals used were mild steel (having a composition prescribed in JIS SS-34), brass (having a composition of Cu/Zn = 60/40), stainless steel (containing) 18 percent of Cr), copper (having a purity of 99.9 percent) and gun metal (Cu : 87 %, Sn : 10 %, Zn : 2 % and impurities : 1 %).

TABLE 13

| Combinations of adherends | Adhesive compositions D and $B_4$ | | | | $E_1$ or $E_2$ for comparison | | | | |
|---|---|---|---|---|---|---|---|---|---|
| | | Percent | | | | | Percent | | |
| | Kg./cm.² | R | RC | M | Kg./cm.² | R | RC | M | |
| $C_1$-Mild steel | 72.8 | 98 | 2 | 0 | | 25 | 0 | 40 | 60 |
| $C_1$-Brass | 65.5 | 95 | 5 | 0 | | 30 | 0 | 50 | 50 |
| $C_1$-Stainless steel | 62.0 | 88 | 12 | 0 | $E_1$ | 15 | 0 | 10 | 90 |
| $C_1$-Copper | 50.0 | 82 | 18 | 0 | | 10 | 0 | 10 | 90 |
| $C_1$-Gun metal | 52.5 | 80 | 20 | 0 | | 15 | 0 | 15 | 85 |
| $C_2$-Mild steel | 68.0 | 98 | 2 | 0 | | 35 | 5 | 50 | 45 |
| $C_2$-Brass | 60.6 | 95 | 5 | 0 | | 30 | 8 | 55 | 37 |
| $C_2$-Stainless steel | 55.0 | 88 | 12 | 0 | $E_2$ | 15 | 0 | 45 | 55 |
| $C_2$-Copper | 52.8 | 80 | 20 | 0 | | 15 | 0 | 40 | 60 |
| $C_2$-Gun metal | 58.5 | 85 | 15 | 0 | | 18 | 0 | 40 | 60 |

Note : R represents rubber break; RC represents peeling at the interface between rubber and an adhesive; and M represents peeling at the interface between a metal and an adhesive. The figures represent the percentages of peeling, respectively.

The above results show that the adhesives according to the present invention are far superior to $E_1$ and $E_2$ for comparison.

EXAMPLE 5

TABLE 14

| | Adhesive Composition $B_5$ |
|---|---|
| Halogenated ethylene-propylene-dicyclopentadiene terpolymer (Chlorine content: 20% by weight, Bromine content: 3% by weight (g.) | 65 |
| Chlorinated rubber (Chlorine content : 65% by weight) (g.) | 35 |
| Carbon black ("Seast 305")(g.) | 25 |
| Tetramethylthiuram disulfide(g.) | 2 |
| Xylene(g.) | 400 |

The halogenated terpolymer and chlorinated rubber shown in Table 14 were dissolved in xylene. Carbon black and tetramethylthiuram disulfied were uniformly dispersed in the solution.

In the same manner as in Example 4, adherends as shown in Table 15 were adhered to each other, except that Adhesive Composition $B_5$ was substituted for Adhesive Composition $B_4$, and the product was subjected to the same test as in Example 4 to obtain results as shown in Table 15. This Table clearly shows that the adhesive according to the present invention was clearly superior to Adhesives $E_1$ and $E_2$ for comparison in Example 4.

TABLE 15

| Combinations of adherends | Adhesive Compositions D and $B_5$ | | | |
|---|---|---|---|---|
| | kg/cm² | R (%) | RC (%) | M (%) |
| $C_1$-Mild steel | 80.0 | 100 | 0 | 0 |
| $C_1$-Brass | 74.8 | 98 | 2 | 0 |
| $C_1$-Stainless steel | 75.0 | 95 | 5 | 0 |
| $C_1$-Copper | 74.0 | 95 | 5 | 0 |
| $C_1$-Gun metal | 65.0 | 90 | 10 | 0 |
| $C_2$-Mild steel | 70.5 | 95 | 5 | 0 |
| $C_2$-Stainless steel | 68.7 | 90 | 10 | 0 |
| $C_2$-Copper | 60.0 | 82 | 18 | 0 |
| $C_2$-Gun metal | 62.8 | 88 | 12 | 0 |

EXAMPLE 6

TABLE 16

| | Adhesive $B_6$ |
|---|---|
| Halogenated ethylene-propylene-divinylbenzene terpolymer (Chlorine content: 16% by weight) (g.) | 20 |
| Chlorinated rubber (Chlorine content: 65% by weight) (g.) | 80 |
| Zinc oxide(g.) | 1 |
| p-Quinone dioxime(g.) | 2 |
| Red lead(g.) | 1 |
| Xylene(g.) | 400 |

The halogenated terpolymer and chlorinated rubber shown in Table 16 were dissolved in xylene. Zinc oxide, p-quinone dioxime and red lead were uniformly dispersed in the solution. In the same manner as in Example 4, adherends as shown in Table 17 were bonded to each other, except that Adhesive Composition $B_6$ was substituted for Adhesive Composition $B_4$, and the product thus obtained was subjected to the same test as in Example 4 to obtain results as shown in said Table. As seen from Table 17, the results were satisfactory.

TABLE 17

| Combinations of adherends | Adhesive Compositions D and $B_6$ | | | |
|---|---|---|---|---|
| | kg/cm² | R (%) | RC (%) | M (%) |
| $C_1$-Mild steel | 70.4 | 85 | 15 | 0 |
| $C_1$-Brass | 62.8 | 82 | 18 | — |

EXAMPLE 7

TABLE 18

| | Adhesive $B_7$ |
|---|---|
| Halogenated ethylene-propylene-dicyclopentadiene terpolymer (Chlorine content: 42% by weight) (g.) | 45 |
| Chlorinated rubber (Chlorine content: 65% by weight) (g.) | 55 |
| Xylene (g.) | 400 |

The halogenated terpolymer and chlorinated rubber shown in Table 18 were dissolved in xylene. Adherends as shown in Table 19 were bonded to each other in the same manner as in Example 4, except that Adhesive Composition $B_7$ was substituted for Adhesive Composition $B_4$, and the product thus obtained was subjected to the same test as in Example 4 to obtain results as shown in said Table.

TABLE 19

| Combinations of adherends | Adhesive Compositions D and $B_7$ | | | |
|---|---|---|---|---|
| | kg/cm² | R (%) | RC (%) | M (%) |
| $C_1$-Mild steel | 68.0 | 60 | 40 | 0 |
| $C_1$-Brass | 61.5 | 75 | 25 | 0 |

EXAMPLE 8

An adherend as shown in Table 20 was bonded to a mild steel in a manner similar to that in Example 4, except that a primer consisting of 90 parts by weight of a chlorinated rubber and 10 parts by weight of a chlorinated ethylene-propylene-dicyclopentadiene rubber (chlorine content : 35 percent by weight) and an adhesive composition consisting of 100 parts by weight of a chlorinated, brominated ethylene-propylene-dicyclopentadiene terpolymer (chlorine content : 16 percent by weight; bromine content : 4 percent by weight), 80 parts by weight of carbon black and 1,620 parts by weight of toluene were substituted for Adhesive Composition D and Adhesive Composition $B_4$, respectively, to obtain results as shown in Table 20.

TABLE 20

| Adherends | Adhesion (kg/cm²) | State of break | |
|---|---|---|---|
| | | R (%) | RC (%) |
| $C_1$-Mild steel | 83.0 | 98 | 2 |
| $C_3$-Mild steel | 64.0 | 90 | 10 |
| $C_4$-Mild steel | 73.0 | 35 | 65 |
| $C_5$-Mild steel | 100.0 | 97 | 3 |

EXAMPLE 9

An adherend as shown in Table 23 was bonded to a mild steel in a manner similar to that in Example 4, except that a primer as shown in Table 21 and an adhesive composition as shown in Table 22 were substituted for Adhesive Composition D and Adhesive Composition $B_4$, respectively, to obtain results as shown in Table 23.

TABLE 21

Primer

| | Adhesive composition (Primer) |
|---|---|
| Chlorinated rubber (Chlorine content: 65% by weight)(g.) | 85 |
| Brominated poly-2-chlorobutadiene (Bromine content: 11% by weight)(g.) | 15 |
| Magnesium oxide(g.) | 1 |
| Zinc oxide(g.) | 0.5 |

| | |
|---|---|
| Methyl isobutyl ketone(g.) | 370 |
| Monochlorobenzene(g.) | 30 |

TABLE 22

| | Adhesive composition |
|---|---|
| Halogenated ethylene-propylene-ethylidenenorbornene terpolymer(g.) (Chlorine content: 20% by weight) (Bromine content: 4.3% by weight) | 100 |
| Carbon black(g.) | 80 |
| Toluene(g.) | 1,440 |

TABLE 23

| Adherends | Adhesion (kg/cm²) | State of break R (%) | RC (%) |
|---|---|---|---|
| C₁-Mild steel | 78.5 | 95 | 5 |
| C₃-Mild steel | 69.5 | 93 | 7 |

What we claim is:

1. A process for adhering an unvulcanized compounded rubber to the same or a different compounded rubber or a metal, which comprises dissolving in an organic solvent a halogenated terpolymer of ethylene, an α-olefin other than ethylene and a non-conjugated diolefin having a chlorine content of 13 to 50 percent by weight or a chlorine content of 10 to 30 percent by weight and a bromine content of 1 to 10 percent by weight, applying the resulting solution to at least one of the substrates, contacting the substrates with each other through the applied solution and then heating the resulting assembly under pressure.

2. A process according to claim 1, wherein the chlorine content or the chlorine and bromine content of the halogenated terpolymer is 16 to 38 percent by weight.

3. A process according to claim 1, wherein an unvulcanized lowly unsaturated rubber is adhered to an unvulcanized rubber.

4. A process according to claim 1, wherein the adhesive composition contains vulcanizing compounding agents.

5. A process for adhering an unvulcanized compounded rubber to a metal, which comprises applying to the metal a primer consisting of an organic solvent solution of a chlorinated rubber or a mixture of chlorinated rubbers, or a mixture of chlorinated rubbers with a halogenated ethylene-propylene-non-conjugated diolefin terpolymer, applying thereto an adhesive composition consisting of an organic solvent solution of a mixture of 20 to 65 parts by weight of a chlorinated terpolymer of ethylene, an α-olefin other than ethylene and a non-conjugated diolefin having a chlorine content of 13 to 50 percent by weight and 35 to 80 parts by weight of a chlorinated rubber, placing the unvulcanized compounded rubber on the adhesive composition layer and then heating under pressure the resulting assembly.

6. A process according to claim 5, wherein the adhesive composition contains active fillers.

7. A process according to claim 5, wherein the adhesive composition contains vulcanizing compounding agents.

8. A process for tightly adhering an unvulcanized compounded rubber to a metal, which comprises applying to the metal a primer consisting of an organic solvent solution of at least one of halogenated rubbers, chlorinated rubber, halogenated ethylene- an α-olefin other than ethylene- a non-conjugated diolefin terpolymer, poly-2-chlorobutadiene, and halogenated poly-2-chlorobutadiene, applying thereto an adhesive composition prepared by dissolving in an organic solvent 100 parts by weight of a halogenated terpolymer of ethylene, an α-olefin other than ethylene and a non-conjugated diolefin having a chlorine content of 10 – 30 percent by weight and bromine content of 1 to 10 percent by weight and 40 to 90 parts by weight of carbon black, placing the unvulcanized compounded rubber on the adhesive composition layer and then heating under pressure the resulting assembly.

9. A process for adhering an unvulcanized compounded rubber to a metal, which comprises applying to the metal a primer consisting of an organic solvent solution of a chlorinated rubber, a mixture of chlorinated rubbers or a mixture of chlorinated rubbers with a chlorinated ethylene-propylene-non-conjugated diolefin terpolymer, applying thereto an adhesive composition consisting of an organic solvent solution of a mixture of 70 to 40 parts by weight of a chlorinated, brominated ethylene-propylene-dicyclopentadiene terpolymer having a chlorine content of 10 to 30 percent by weight and a bromine content of 1 to 10 percent by weight and 30 to 60 parts by weight of a chlorinated rubber, placing the unvulcanized compounded rubber on the adhesive composition layer and then heating under pressure the resulting assembly.

10. A process according to claim 9, wherein the adhesive composition contains active fillers.

* * * * *

UNITED STATES PATENT OFFICE
CERTIFICATE OF CORRECTION

Patent No. 3,657,046         Dated April 18, 1972

Inventor(s) Junji Furukawa et al.

It is certified that error appears in the above-identified patent and that said Letters Patent are hereby corrected as shown below:

In column 1, please insert the following missing claim for priority:

--Japanese Appln. No. 33926/66 dated May 26, 1966
Japanese Appln. No. 33927/66 dated May 26, 1966--

Signed and sealed this 19th day of December 1972.

(SEAL)
Attest:

EDWARD M. FLETCHER, JR.                ROBERT GOTTSCHALK
Attesting Officer                      Commissioner of Patents